United States Patent [19]

Scarfer

[11] Patent Number: 5,584,657
[45] Date of Patent: Dec. 17, 1996

[54] WINDMILL BLADE WITH BOOSTER MEMBERS

[76] Inventor: Alexander Scarfer, 8975 Shoreham Dr., Los Angeles, Calif. 90069

[21] Appl. No.: 570,536

[22] Filed: Dec. 11, 1995

[51] Int. Cl.[6] .............................. F03D 1/00; F03D 11/00
[52] U.S. Cl. ........................................................ 416/144
[58] Field of Search ................................. 416/144, 145

[56] References Cited

U.S. PATENT DOCUMENTS

| | | | |
|---|---|---|---|
| 181,196 | 8/1876 | Nysewander | 415/145 X |
| 1,966,352 | 7/1934 | Mahony | 416/144 |
| 1,967,461 | 7/1934 | Ballew | 416/144 |
| 2,944,610 | 7/1960 | Gluhareff | 416/144 |
| 3,594,098 | 7/1970 | Pratinidhi | 416/144 |

*Primary Examiner*—Edward K. Look
*Assistant Examiner*—Michael S. Lee

[57] ABSTRACT

A windmill blade with booster members comprised of a circular mounting portion having a receiving aperture formed through a central portion thereof. The circular mounting portion is adapted for coupling with a free standing leg member. A plurality of elongated blade members are coupled with the circular mounting portion. A plurality of weighted spherical members are secured to distal ends of their respective elongated member.

1 Claim, 2 Drawing Sheets

WINDMILL BLADE WITH BOOSTER MEMBERS

BACKGROUND OF THE INVENTION

1. Field of the Invention

The present invention relates to a windmill blade with booster members and more particularly pertains to increasing the speed that the windmill circulates with a windmill blade with booster members.

2. Description of the Prior Art

The use of windmill blades is known in the prior art. More specifically, windmill blades heretofore devised and utilized for the purpose of generating power are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,219,454 to Class discloses a method and apparatus for balancing wind turbine rotors comprising a balancing weight having an essentially bent L-shape.

U.S. Pat. No. 5,195,871 to Hsech-Pen discloses a self-restoring windmill including a plurality of fan blade units pivotally mounted in a central, vertical transmission shaft.

U.S. Pat. No. 4,718,821 to Clancy discloses a windmill blade featuring spring biased weight members for enhancing blade response to the prevailing wind direction.

U.S. Pat. No. 4,352,633 to Tassen discloses a windmill blade stalling and speed control device.

U.S. Pat. No. 4,295,790 to Eggert, Jr. discloses a blade structure for use in a windmill.

U.S. Pat. No. 4,171,929 to Allison discloses a blade for windmill.

U.S. Pat. No. 3,874,816 to Sweeney et al. discloses a windmill blade.

While these devices fulfill their respective, particular objective and requirements, the aforementioned patents do not describe a windmill blade with booster members for increasing the speed that the windmill circulates.

In this respect, the windmill blade with booster members according to the present invention substantially departs from the conventional concepts and designs of the prior art, and in doing so provides an apparatus primarily developed for the purpose of increasing the speed that the windmill circulates.

Therefore, it can be appreciated that there exists a continuing need for new and improved windmill blade with booster members which can be used for increasing the speed that the windmill circulates. In this regard, the present invention substantially fulfills this need.

SUMMARY OF THE INVENTION

In the view of the foregoing disadvantages inherent in the known types of windmill blades now present in the prior art, the present invention provides an improved windmill blade with booster members. As such, the general purpose of the present invention, which will be described subsequently in greater detail, is to provide a new and improved windmill blade with booster members and method which has all the advantages of the prior art and none of the disadvantages.

To attain this, the present invention essentially comprises a circular mounting portion having a receiving aperture formed through a central portion thereof. The circular mounting portion is adapted for coupling with a free standing leg member. The device contains a plurality of elongated blade members. Each of the blade members has a proximal end and a distal end. Each proximal end is coupled to a central portion. The central portion is dimensioned to receive the circular mounting portion. The plurality of elongated members extend outwardly from the central portion in a helical arrangement. The device contains a plurality of spherical members. Each of the spherical members are secured in a corner of the distal ends of respective plurality of elongated members on opposing sides thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

in this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved windmill blade with booster members which has all the advantages of the prior art windmill blades and none of the disadvantages.

It is another object of the present invention to provide a new and improved windmill blade with booster members which may be easily and efficiently manufactured and marketed.

It is a further object of the present invention to provide a new and improved windmill blade with booster members which is of durable and reliable construction.

An even further object of the present invention is to provide a new and improved windmill blade with booster members which is susceptible of a low cost of manufacture with regard to both materials and labor, and which accordingly is then susceptible of low prices of sale to the consuming public, thereby making such a windmill blade with booster members economically available to the buying public.

Still yet another object of the present invention is to provide a new and improved windmill blade with booster members which provides in the apparatuses and methods of the prior art some of the advantages thereof, while simultaneously overcoming some of the disadvantages normally associated therewith.

Even still another object of the present invention is to provide a new and improved windmill blade with booster members for increasing the speed that the windmill circulates.

Lastly, it is an object of the present invention to provide a new and improved windmill blade with booster members comprised of a circular mounting portion having a receiving aperture formed through a central portion thereof. The circular mounting portion is adapted for coupling with a free standing leg member. A plurality of elongated blade members are coupled with the circular mounting portion. A plurality of weighted spherical members are secured to distal ends of their respective elongated member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
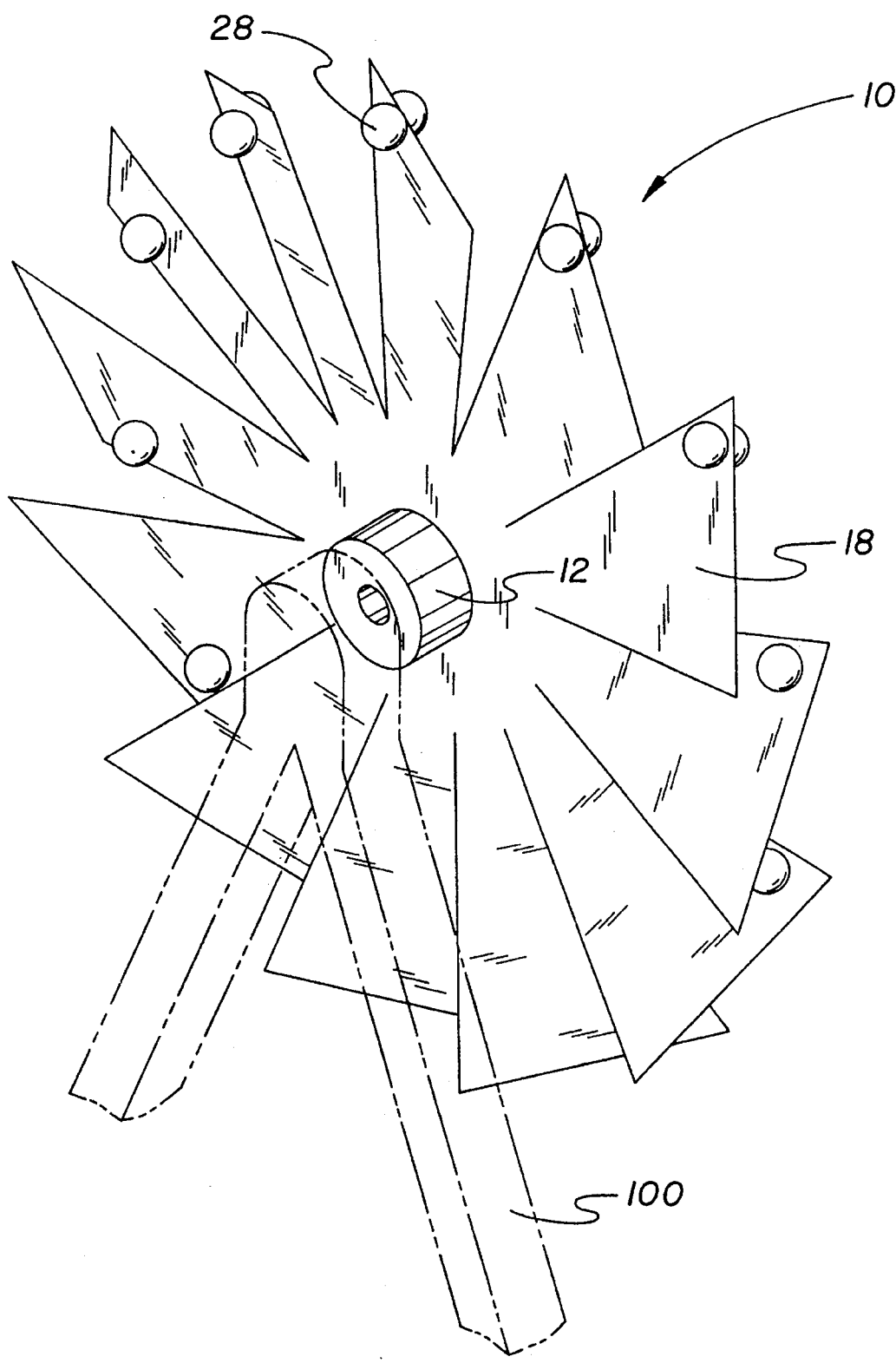
FIG. 1 is a perspective view of the preferred embodiment of the windmill blade with booster members constructed in accordance with the principles of the present invention.

With reference now to the drawings, and in particular, to FIG. 1 thereof, the preferred embodiment of the new and improved windmill blade with booster members embodying the principles and concepts of the present invention and generally designated by the reference number 10 will be described.

Specifically, it will be noted in the various Figures that the device relates to a new and improved windmill blade with booster members for increasing the speed that the windmill circulates. In its broadest context, the device consists of a circular mounting portion, a plurality of elongated blade members, and a plurality of weighted spherical members. Such components are individually configured and correlated with respect to each other so as to attain the desired objective.

The device 10 includes a circular mounting portion 12 having a receiving aperture 14 formed through a central portion thereof. The circular mounting portion 14 is adapted for coupling with a free standing leg member 100. The receiving aperture 14 is adapted to freely rotate with respect to the free standing leg member 100. FIG. 1 illustrates the coupling of the circular mounting portion 12 with the free standing leg member 100 (shown in outline).

Figure 2:
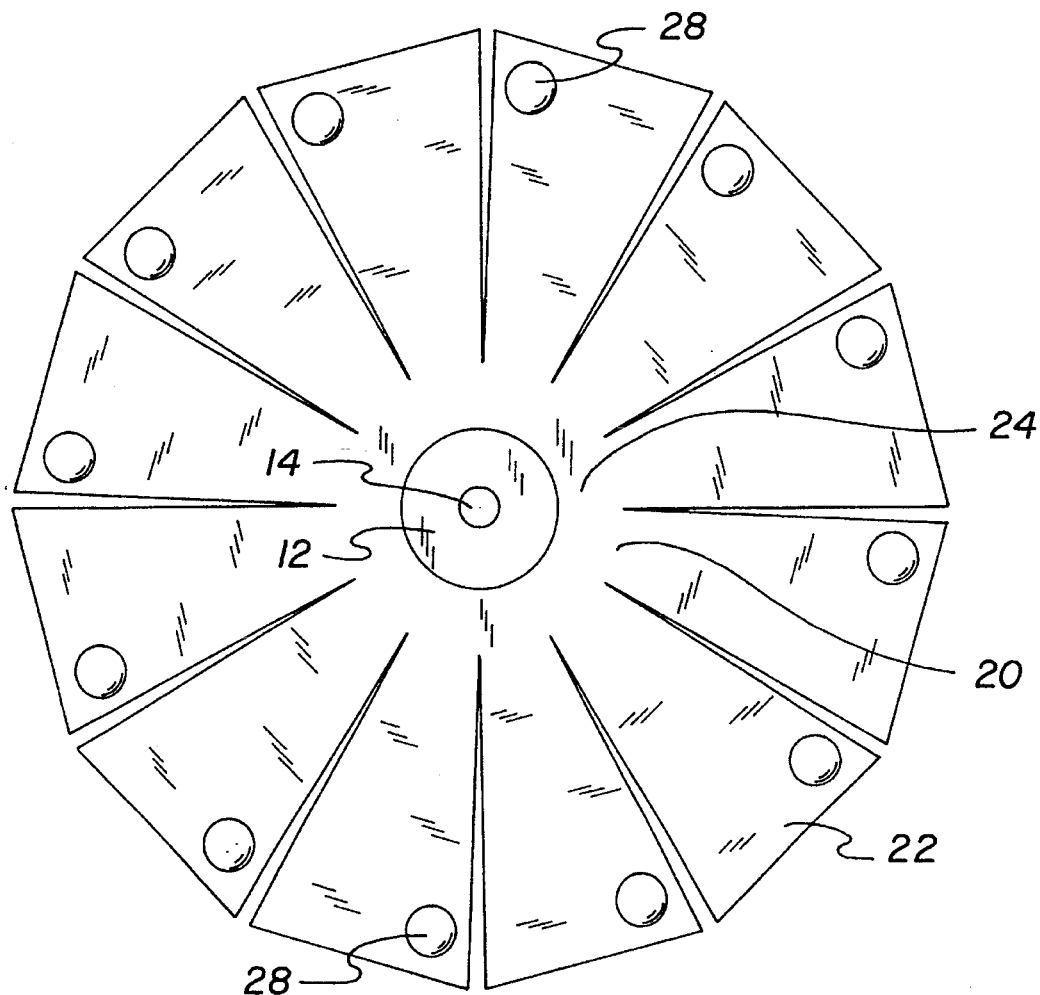
FIG. 2 is a front elevation view of the present invention.
Figure 3:
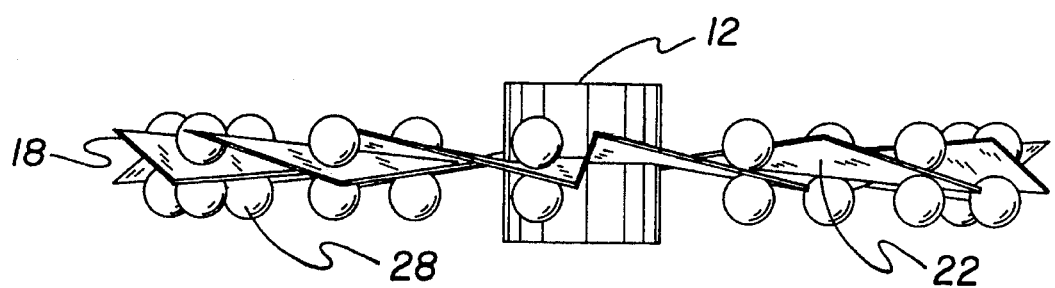
FIG. 3 is a plan view of the preferred embodiment of the present invention.

The device 10 contains a plurality of elongated blade members 18. Each of the blade members 18 has a proximal end 20 and a distal end 22. Each proximal end 20 is coupled to a central portion 24. The central portion 24 is dimensioned to receive the circular mounting portion 12. The central portion 24 is positioned intermediate end portions of the circular mounting portion 12. The plurality of elongated members 18 extend outwardly from the central portion 24 in a helical arrangement. The preferred number of blade members 18 is twelve. The spacing between the blade members 18 is minimal as illustrated in FIG. 2.

The device 10 contains a plurality of weighted spherical members 28. Each of the spherical members 28 are secured in a corner of the distal ends 22 of respective plurality of elongated blade members 18 on opposing sides thereof. The spherical members 28 provide force to facilitate the rotation of the blade members 18 in cooperation with a slight wind to thereby provide energy to a selected source. Twenty-four spherical members 28 are provided in the preferred embodiment with each of the preferred twelve blade members 18 has a spherical member 28 secured on opposing sides thereof adjacent to a top edge thereof.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A windmill blade with booster members for increasing the speed that the windmill circulates comprising, in combination:

a circular mounting portion having a receiving aperture formed through a central portion thereof, the circular mounting portion adapted for coupling with a free standing leg member;

twelve elongated blade members, each of the blade members having a proximal end and a distal end, each proximal end coupled to a central portion, the central portion dimensioned to receive the circular mounting portion, the plurality of elongated members extending outwardly from the central portion in a helical arrangement, each blade member having a forward edge and a rearward edge on different planes of rotation;

twelve weighted spherical members, each of the spherical members secured in a forward corner of the distal ends of respective elongated members on opposing sides of the elongated members.

* * * * *

UNITED STATES PATENT AND TRADEMARK OFFICE
CERTIFICATE OF CORRECTION

PATENT NO : 5,584,657
DATED : December 17, 1996
INVENTOR(S) : SCHARFER, ALEXANDER It is certified that error appears in the above-identified patent and that said Letters Patent is hereby corrected as shown below:

On the title page, under item [19] and item [75], change "Scarfer" to --Scharfer--.

Signed and Sealed this

Second Day of September, 1997

Attest:

BRUCE LEHMAN

Attesting Officer

Commissioner of Patents and Trademarks